INVENTOR.
Michael McCann
BY
William P. Stewart
ATTORNEY

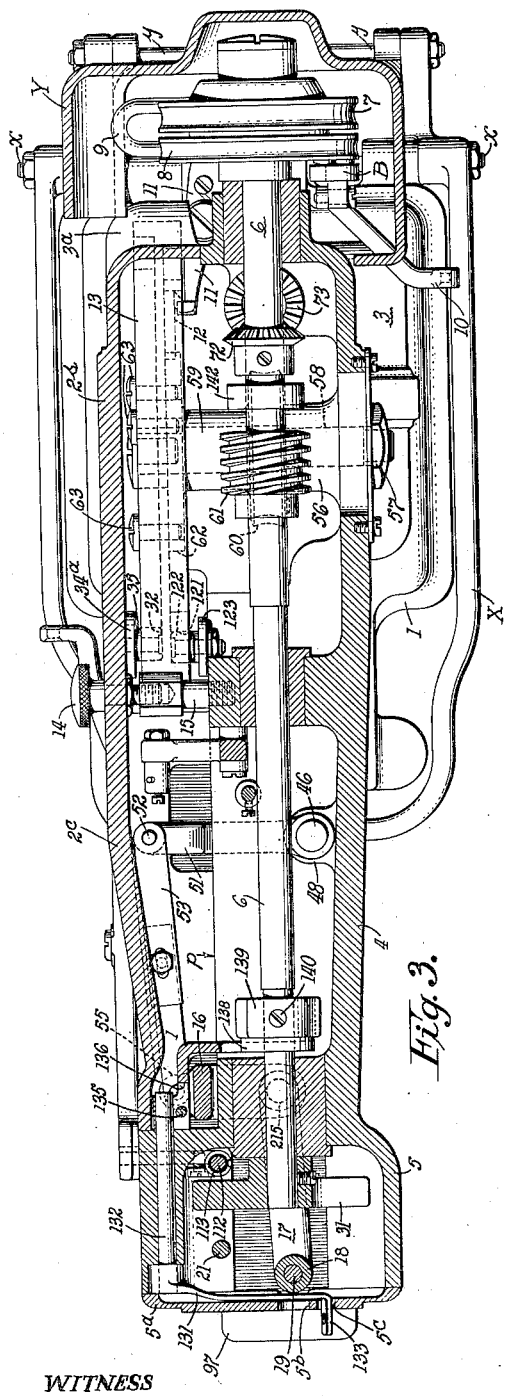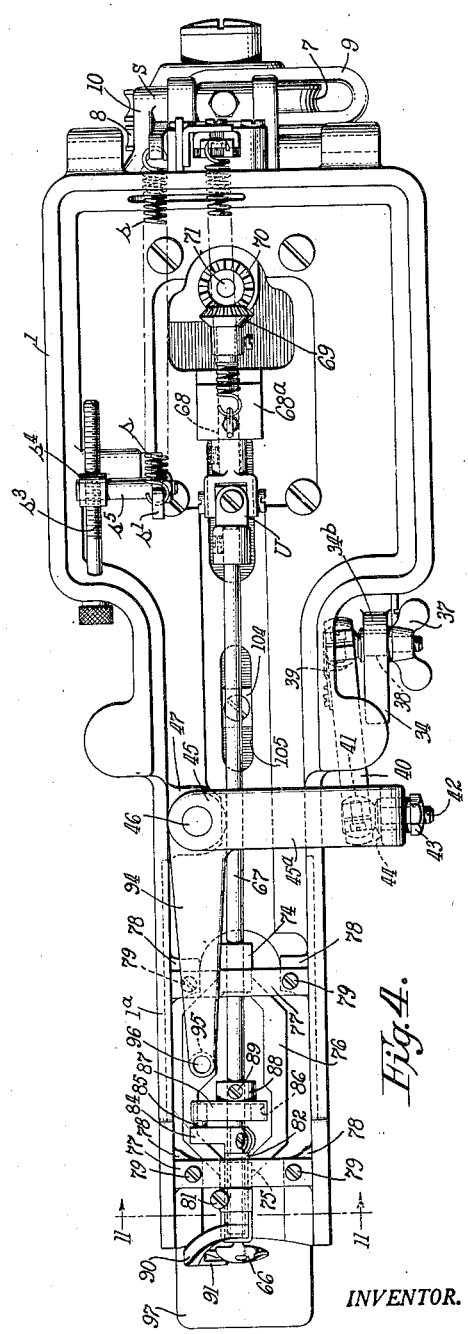

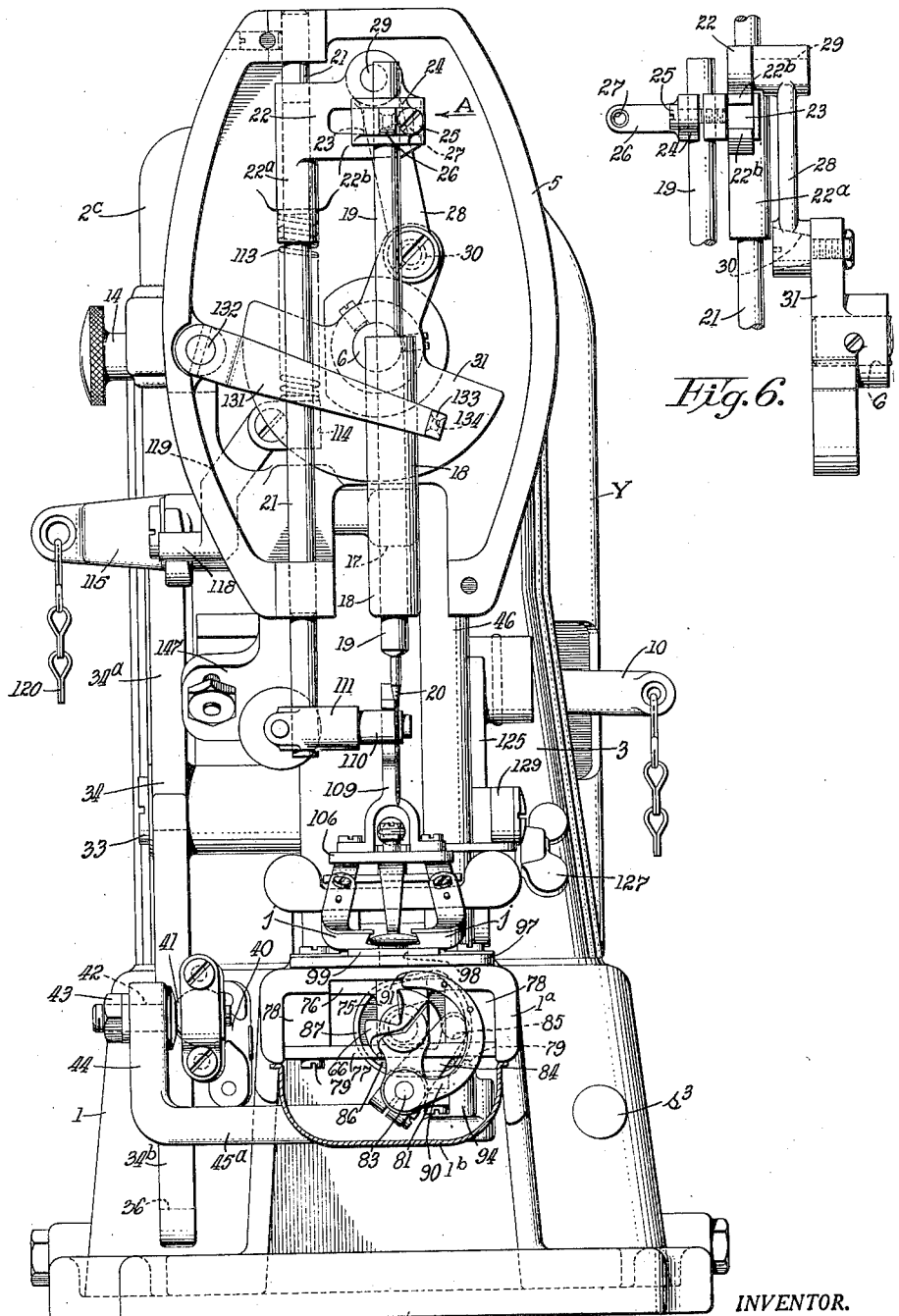

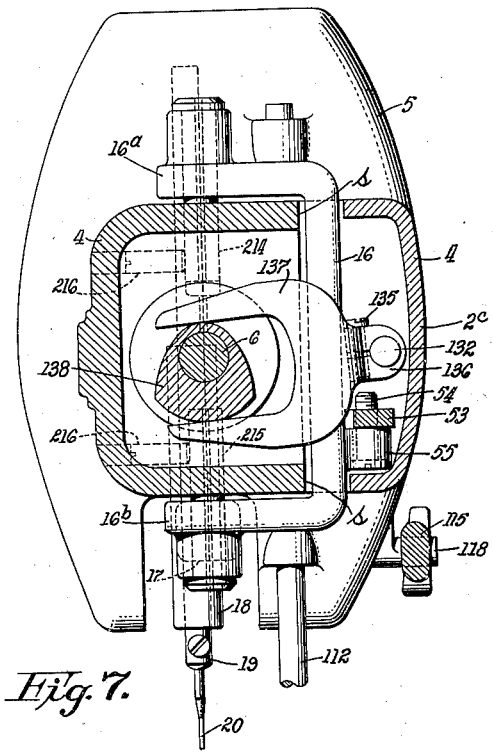
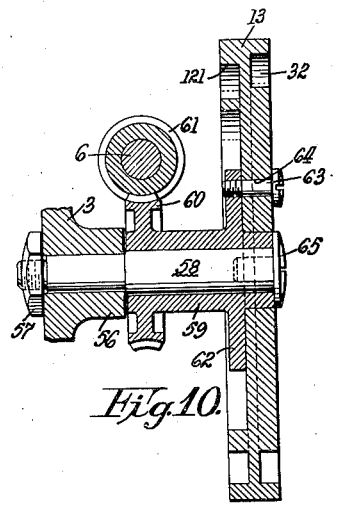
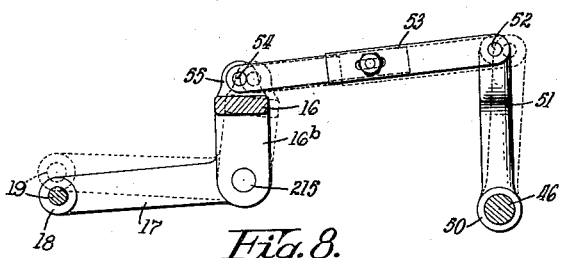
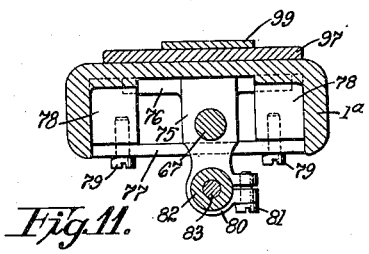
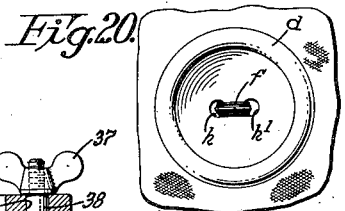
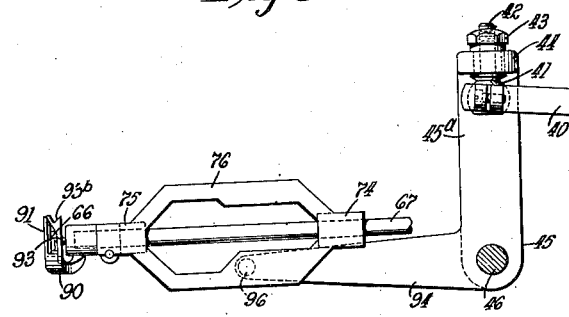
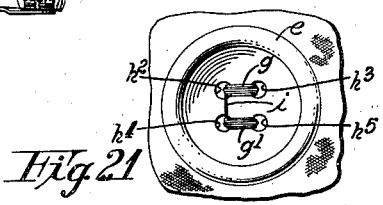

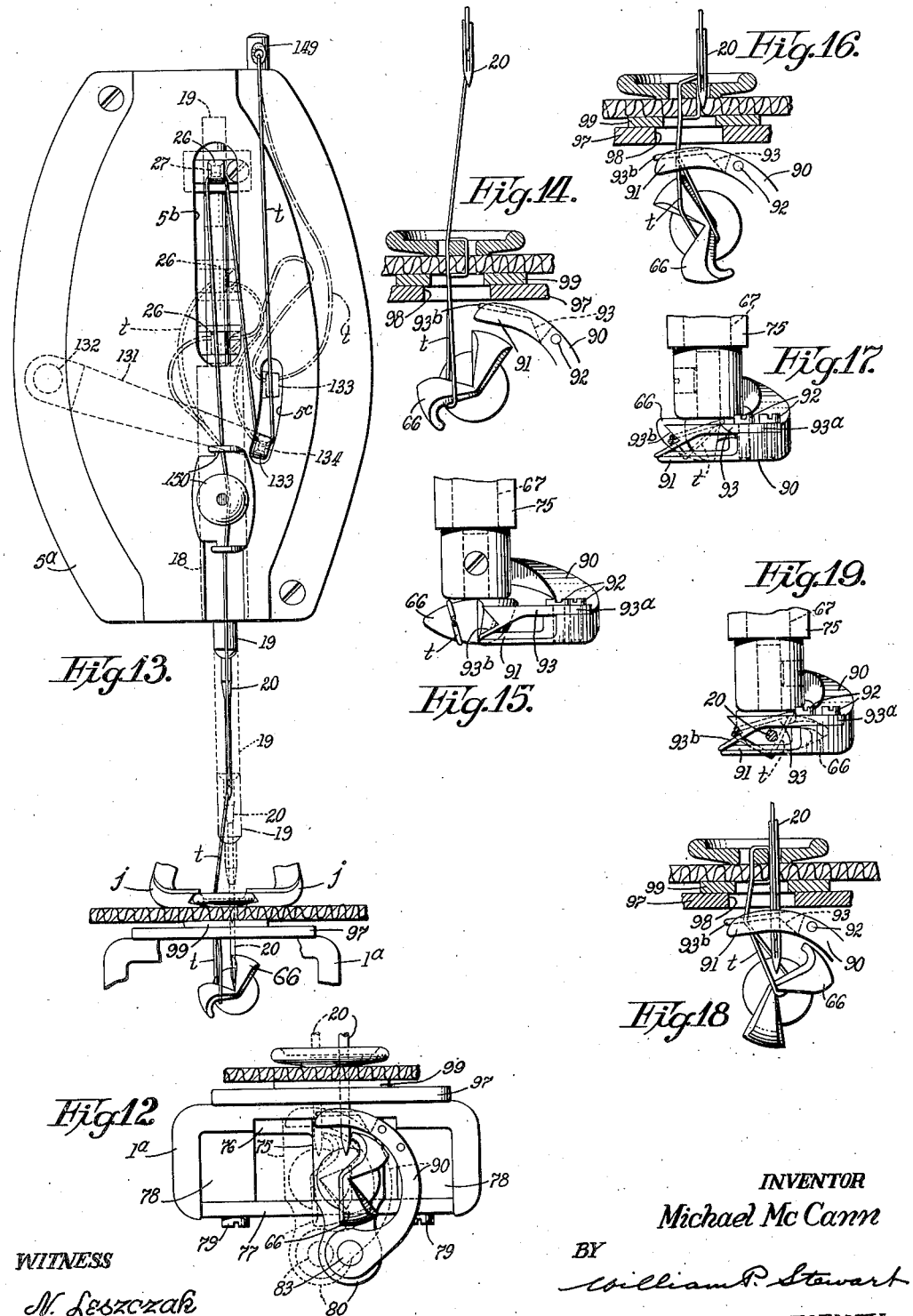

Patented Jan. 17, 1950

2,495,069

UNITED STATES PATENT OFFICE 2,495,069

ARTICLE ATTACHING MACHINE

Michael McCann, Union, N. J., assignor to The Singer Manufacturing Company, Elizabeth, N. J., a corporation of New Jersey Application December 12, 1946, Serial No. 715,685

24 Claims. (Cl. 112—111)

This invention relates to article attaching machines and it has as an object to provide an improved machine of this nature which is capable of operating at a relatively high speed, which is light running, easy to operate, quiet in operation, and which is adapted, with a minimum amount of adjustment, to perform a plurality of diverse article attaching operations.

Another object of the invention is to provide, in a machine of this type, conveniently adjustable means for adapting the machine to attach various sizes of articles such, for example, as large, medium or small, two or four hole flat buttons.

Another object of the invention is to provide, in a button sewing machine, improved means for reciprocating the thread-carrying needle and for vibrating it laterally between successive reciprocations, thereby to cause the needle to enter first one and then the other of a pair of holes in a button, and to combine therewith a shiftable rotary loop-taker adapted to take thread loops from the needle, and a shiftable oscillatory needle-guide and loop-positioner designed respectively to guide the needle and to engage and position one needle-thread loop so that the loop-taker will carry the succeeding thread loop therethrough.

Still another object of the invention is to utilize a portion of the needle-vibrating means for giving shifting movements to the loop-taker and needle-loop positioner so that the relative positions of the needle, loop-taker and loop-positioner are always the same in the different lateral positions of the needle.

A further object of the invention is to provide a single adjustment for simultaneously varying the extent of vibration of the needle and the shift of the loop-taker, needle-guide and loop-positioner from zero to maximum and to any intermediate point.

A still further object is to provide improved thread controlling means, operable during the formation of each stitch, which will facilitate withdrawal of the needle-loop positioner and assist in the setting of the stitch.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

In the drawings,

Fig. 3 is a horizontal sectional view taken substantially on the line 3—3 of Fig. 1.

Fig. 4 is a bottom view of the improved machine.

Fig. 5 is an enlarged front end view of the machine with the face plate thereof removed.

Fig. 6 is a detail view of the needle-bar reciprocating mechanism, looking in the direction indicated by the arrow A in Fig. 5.

Fig. 7 is a transverse sectional view taken substantially on the line 7—7 of Fig. 1.

Fig. 8 is a detail plan view, partly in section, of a portion of the needle-bar vibrating mechanism.

Fig. 9 is a detail plan view, partly in section, of the means for vibrating the looper shaft, looper, needle-guide and thread-positioner, later to be described.

Fig. 10 is a detail vertical sectional view taken substantially on the line 10—10 of Fig. 1.

Fig. 11 is a transverse sectional view through the work-supporting arm, taken substantially on the lines 11—11 of Figs. 2 and 4, the removable sheet metal cover, which closes the under side of the arm, being omitted.

Fig. 12 is an enlarged front end view of the work-supporting arm and parts carried thereby, together with the needle, indicating in full and dotted lines the corresponding lateral movement of the needle, looper, needle-guide and thread-positioner.

Fig. 13 is a diagrammatic view, looking toward the front end of the machine, illustrating in full lines, dotted lines and dot-dash lines, the critical positions of the needle-bar and needle and the action of the thread control mechanism in conjunction therewith.

Figs. 14, 15, 16, 17, 18 and 19 are enlarged complemental end and plan views, alternately, of the lower stitch-forming mechanism, in conjunction with the needle and/or needle-thread, and corresponding, respectively, to the full line, dotted line and dot-dash line positions of the needle-bar in Fig. 13.

Fig. 20 is a face view of a two-hole flat button as attached by the present machine.

Fig. 21 is a face view of a four-hole flat button as attached by the present machine.

Figure 1:
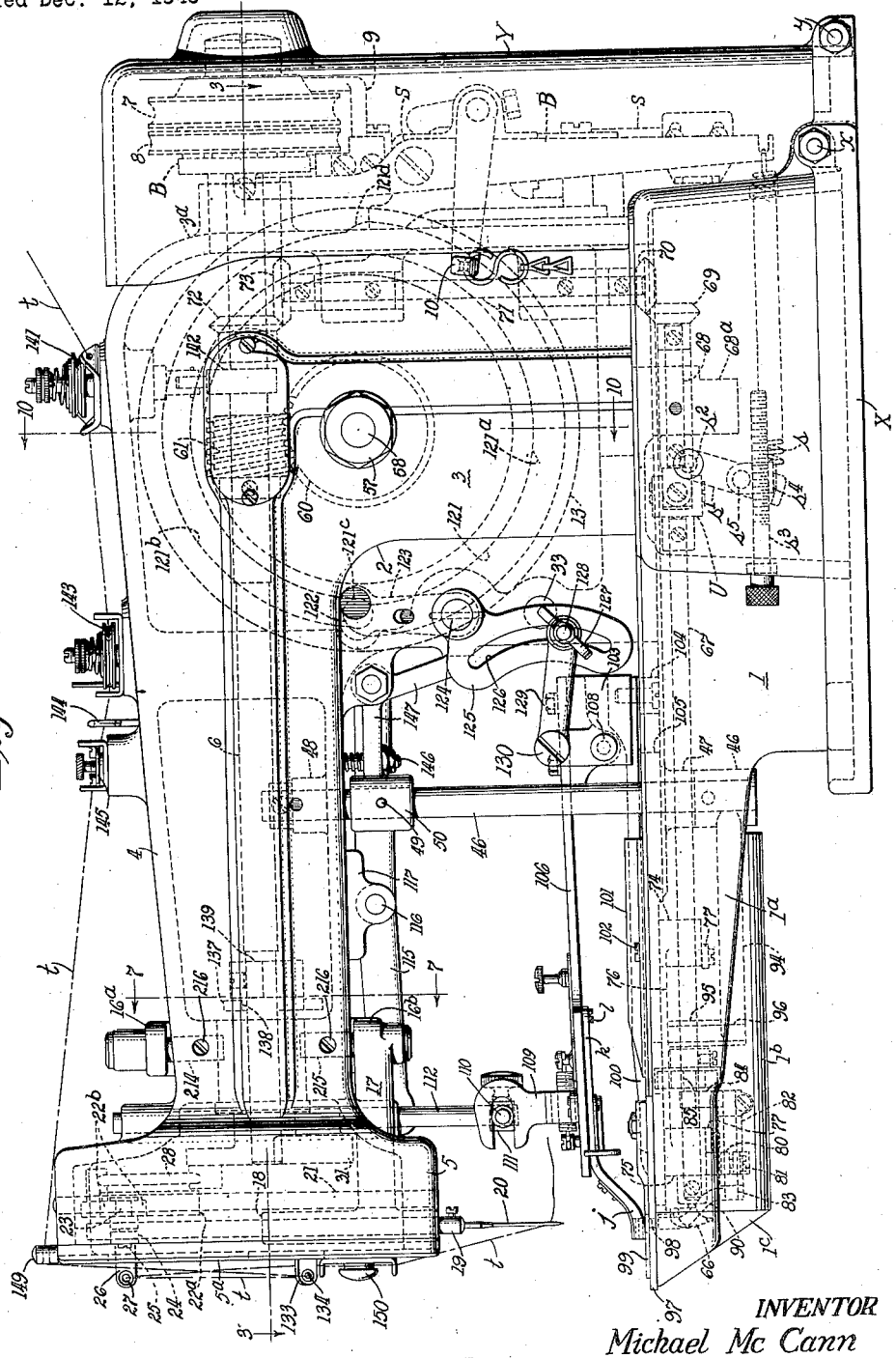
Fig. 1 is a right side elevation of an article attaching machine embodying the present invention.

Referring more specifically to the drawings, the invention is disclosed as embodied in an article attaching machine having a frame comprising a bed 1, having a laterally extending work-supporting arm 1a, a bracket-arm 2, consisting of a standard 3 secured to the bed 1, and an overhanging arm 4 terminating in an open-faced bracket-arm head 5 normally closed by a removable face-plate 5a. The arm 1a is of substantially inverted U-shape in cross section and is normally closed at the bottom by a removable sheet metal cover 1b having, at its outer end, a spring pressed hinged closure 1c. Journaled lengthwise of the arm 4 is a main or drive shaft 6 carrying, at its rear end, loose and tight pulleys 7 and 8, respectively, adapted to be driven by a suitable power driven belt, not shown. Starting and stopping of the machine is controlled by a conventional stop-motion mechanism designated generally as S, including a belt shifter 9, adapted to shift the belt from the loose pulley to the tight pulley, and conversely, and a brake mechanism, designated generally as B, adapted to act upon the tight pulley 8 to reduce the speed of rotation of the main shaft before it is finally stopped by the stop-motion mechanism. The stop-motion is provided with a treadle-actuated starting lever 10 and is held in running position by a spring-pressed latch 11 until the latch is automatically tripped, after a predetermined number of stitches have been made, by a cam-lug 12 carried by a rotating cam wheel 13, later to be described. For a further and more complete understanding of the structural characteristics and operation of these stop-motion and brake mechanisms, reference may be had to United States patents of Barron, No. 1,093,241, April 14, 1914, and Fifield, No. 1,498,649, June 24, 1924.

This brake mechanism, however, differs slightly from the brake mechanism disclosed in the Fifield patent, i. e., in the means for varying the tension of the coil spring which swings the brake lever and forces the brake shoe into contact with the side face of the pulley 8. In the present machine a coil spring $s$ is connected, at one end, to the lower end of the brake lever and, at its other end, to the lower end of an arm $s^1$ pivoted, at $s^2$, in the machine bed. A screw $s^3$ journaled in the machine bed carries a nut $s^4$ to which is secured a laterally projecting pin $s^5$ slidably connected to the arm $s^1$. Thus, by rotating the screw $s^3$, the nut $s^4$ is caused to travel thereon, thereby swinging the arm $s^1$ and varying the tension of the spring $s$.

Preferably, and as shown in the drawings, the bed 1 is pivotally secured, at $x$, to, and rests upon, a base X which also pivotally supports, at $y$, a guard member Y which, together with the rear wall 3a of the standard 3, substantially house the pulleys 7 and 8, the stop-motion mechanism S and the brake mechanism B.

Figure 2:
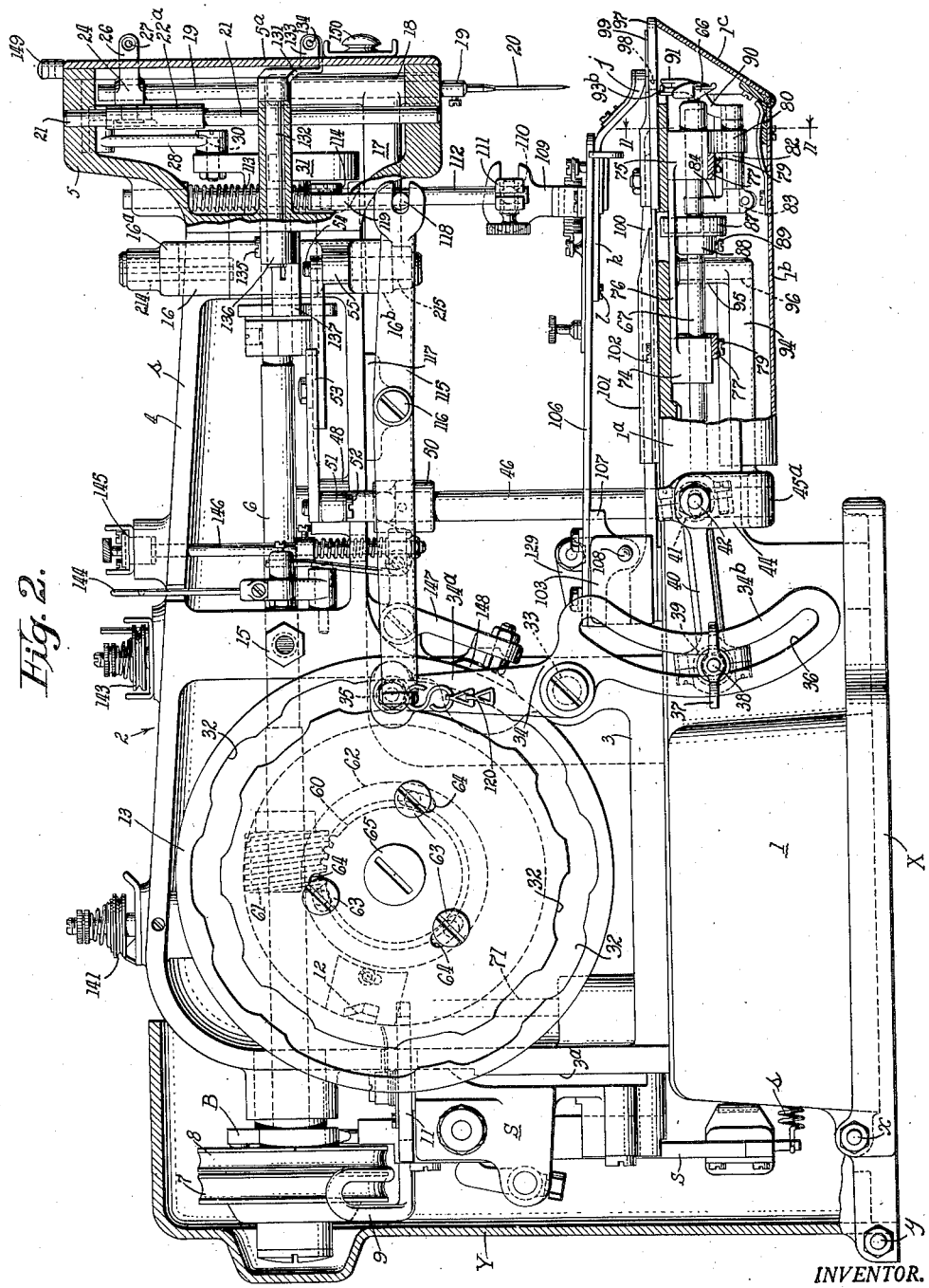
Fig. 2 is a left side elevation of the machine shown in Fig. 1, with a cover plate thereof removed and certain parts shown in section.

The bracket-arm 2 is divided longitudinally along the line $p$ in Fig. 3 and the rear portion thereof consists of a removable cover plate or casting 2c which is secured to the stationary part of the bracket-arm by a screw 14 (Fig. 3) journaled in the removable cover plate and removably threaded into a fixed stud 15 which, in turn, is fixedly threaded into the forward stationary portion of the bracket-arm. Withdrawal of the screw 14 from the fixed stud 15 permits removal of the cover plate 2c as shown in Fig. 2. This two-part construction of the bracket-arm facilitates initial assembling of the mechanism within the arm and later removal of the cover plate affords convenient access to the parts within the bracket-arm for the purpose of inspection and repair.

Journaled on the arm 4 by vertically disposed studs 214 and 215, respectively, secured in the arm by set screws 216, are the upper and lower ends 16a and 16b of a horizontally disposed U-shaped frame or gate 16. At its lower end, this frame is provided with a horizontally arranged forwardly projecting portion 17 which extends into the bracket-arm head and has formed integrally therewith a vertically disposed sleeve 18 in which is reciprocably mounted a needle-bar 19 carrying, at its lower end, an eye-pointed thread-carrying needle 20. Fixed in the head 5, parallel to but at one side and slightly rearwardly of the needle-bar, is a guide-bar 21 on which is slidingly mounted the tubular portion 22a of a member 22 having a forked portion 22b adapted slidingly to receive a slide-block 23 forming a part of a collar 24 clamped upon the upper end portion of the needle-bar, by a clamp screw 25. The collar 24 also carries an arm 26 which projects through a slot 5b in the face plate 5a and has therein a thread-eye 27. This arm 26 and eye 27 form part of a thread take-up mechanism later to be described. Vertical reciprocations are given to the member 22, on the bar 21, by the endwise movements of a link 28 journaled, at one end, upon a pin 29, carried by the member 22 and embracing, at its other end, a crank-pin 30 carried by a crank-disk 31 secured upon the forward end of the rotary main shaft 6. The reciprocations of the member 22 are transmitted to the needle-bar and the needle carried thereby by the forked portion 22b, slide block 23 and clamp collar 24.

After each reciprocation of the needle-bar and needle, except the one after the completion of the first group of stitches when attaching a four-hole button and the penultimate reciprocation, the frame 16 is oscillated on its pivots, thereby shifting the needle-bar laterally so that the needle will alternately penetrate the work at spaced points. When attaching flat buttons, this lateral movement causes the needle to enter first one and then the other of a pair of eyes in the button, thus attaching the button to the work by a group of short stitches. Inasmuch as the needle is not vibrated laterally after the penultimate stitch, the last two stitches are made in the same spot thereby forming a knot and effectively locking the stitches against ravelling.

Oscillation of the frame 16 for laterally shifting or vibrating the needle-bar is effected from a cam groove 32 formed in one face of the cam wheel 13 hereinbefore mentioned. Fulcrumed on a horizontally disposed stud 33, secured in the standard 3 (Figs. 2 and 3) is a vertically disposed two-armed lever 34, the upper arm 34a of which carries a roller stud 35 which tracks the cam groove 32. The lower arm 34b of the lever 34 is of segmental shape and has formed therein a segmental slot 36 in which is adjustably secured, by a wing-nut 37, a stud 38. This stud has a ball end 39 embraced by one end of a link 40. The other end of this link embraces the ball end 41 of a similar stud 42 secured by a nut 43 in the upturned portion 44 formed on one arm 45a of a bell-crank lever 45 secured upon the lower end of a vertically disposed shaft 46 journaled in bearing lugs 47 and 48 in the arms 1a and 4, respectively. Beneath the arm 4 the shaft 46 has secured thereto, as by a pin 49, the hub 50 of an arm 51 to the outer end of which is pivotally connected, by a screw 52, one end of a two-part endwise adjustable link 53, the other end of which is pivotally connected by a screw 54 to a lug 55 projecting from the frame 16.

Thus rotation of the cam wheel 13 effects oscillation of the lever 34, bell crank lever 45, shaft 46 and frame 16, which latter, through its arm 17 and sleeve 18 causes lateral vibration of the needle-bar and the needle carried thereby. The amplitude of vibration of the needle-bar may be varied from zero to maximum by shifting the stud 38 from the upper end of the arcuate slot 36, in which position oscillation of the lever 34 transmits zero movement to the link 40 and bell-crank lever 45, to the lower end of the slot 36 where the lever 34 transmits maximum movement to those elements. Lengthening or shortening of the two-part link 53 serves to swing the frame 16 and adjust the position of the needle-bar and needle without varying their extent of vibration.

Heretofore, in machines of this general nature, cam wheels, similar to the cam wheel 13, and the major portion of the driving means therefor, have been fixed upon shafts which have been rotatably journaled in bearings formed in the machine frames. It has been found that in these prior constructions the weight of the cam wheel, its drive, and the load imposed thereon have caused undue wear in the shaft bearings thereby producing excessive looseness and misalignment in the parts. This condition could be corrected only with considerable difficulty and expense. The present invention provides an improved mount and drive for the cam wheel whereby the above mentioned difficulties are obviated.

As shown most clearly in Fig. 10, the forward wall of the standard 3 is formed with a boss 56 within which is rigidly and fixedly secured, as by a nut 57, a stud 58 on which is rotatably journaled a member 59 having, at one end, a worm-wheel 60 driven from a worm 61 secured upon the main shaft 6, and at its other end an annular disk 62. The cam wheel 13 is arranged in contact with the disk 62 and is secured thereto, for angular adjustment, by screws 63 passing through arcuate slots 64 in the cam wheel and threaded into the disk. Angular adjustment of the cam wheel is utilized in timing the parts and for compensating for wear therein. Axial movement of the member 59 and cam-wheel 13, in one direction, is prevented by the end of the hub 56 and in the other direction by a cap screw 65 threaded into one end of the stud 58. It will readily be perceived that the cam-wheel 13 may be conveniently removed from the disk 62 and that other cam wheels having other forms of cam grooves may be substituted therefor.

Cooperating with the needle 20 in the formation of stitches, is a loop-taker 66, preferably in the form of a wing-type rotary chain stitch looper, secured to and rotated by the forward portion 67 of a two-part looper shaft, the rear portion 68 of which is journaled in a bearing boss 68ª provided by the bed 1. The two portions of the looper shaft are coupled together by a universal joint, designated generally as U, which rotates the portion 67 from the portion 68 but permits the former to be swung horizontally relative to the latter. The portion 68 carries, at its rear end, a bevel gear 69 which meshes with and is driven by a similar gear 70 secured upon the lower end of a vertically disposed shaft 71 journaled in bearings in the standard 3 and driven from the main shaft 6 through the medium of a pair of bevel gears 72 and 73. The portion 67 of the looper shaft is journaled in bearings provided by blocks 74 and 75 carried by a sub-frame 76 slidingly mounted on the under side of the upper wall of the work-supporting arm 1ª, as shown most clearly in Figs. 2, 11 and 12. Bars 77 secured to lugs 78 on the underside of the arm 1ª, by screws 79, serve to support the blocks 74, 75.

The block 75 is formed with a split depending lug 80 in which is clamped, by screw 81, a bearing bushing 82. Journaled in the bushing 82 is a rock-shaft 83, carrying, at its rear end, an arm 84 provided with a stud 85 which tracks a cam groove 86 formed in the face of a cam disk 87 fixed to a collar 88 secured upon the looper shaft 67 by a set screw 89. Upon the forward end of the rock-shaft 83 is secured the hub of a curved and offset arm 90 which, at its upper free end is formed with a finger 91 having a rounded inner surface adapted to engage and guide the needle to its proper position relative to the beak of the looper in the event that the needle should be inadvertently bent or deflected. Secured to the inner side of the arm 90, by screws 92, is the shank 93ª of a thread-positioner 93. This member has a forked free end 93ᵇ adapted to engage, in its throat, both limbs of a loop of thread extending from the work to and around the looper, thereby to cause that loop to be shifted laterally and held in such position that the looper will, with certainty, carry the succeeding needle thread loop through the first mentioned loop, to effect concatenation of the loops in the form of single thread chain stitches.

As hereinbefore described, the needle-bar is shifted laterally after each reciprocation except the one after the completion of the first group of stitches, when attaching four-hole buttons, and after the penultimate stitch. During the first period in which the needle-bar is not shifted laterally, the work piece and the button partially attached thereto, are shifted relative to the stitch-forming mechanism thereby causing the needle to descend the next time into the adjacent one of the second pair of holes in the button for the beginning of the formation of a second group of attaching stitches. As before stated, the non-shift of the needle-bar after the penultimate stitch in the second group of attaching stitches causes the formation of a knotting or tying stitch.

To insure proper relative positioning of and cooperation between the needle, looper, needle-guard and thread-positioner regardless of whether the needle descends through one or the other of a pair of holes in a button, means is provided for shifting the looper, needle-guard and thread-positioner laterally with, and to the same extent as the needle. This means comprises an arm 94, forming a part of the bell-crank lever 45, having an upstanding tubular portion 95 which receives a stud 96 secured to and projecting downwardly from the sub-frame 76. Thus rocking of the lever 34 by the cam 13 effects simultaneously equal lateral vibrations of the needle-bar and the needle carried thereby, and the sub-frame 76, looper-shaft 67, looper 66, needle-guide 91 and thread-positioner 93. Adjustment of the stud 38 in the segmental slot 36 in the lever 34 simultaneously varies, in equal amounts, the extent of vibration transmitted to the above mentioned parts.

Secured upon the forward end of the work-supporting arm 1ª above the looper 66 is a throat-plate 97 having a needle hole 98 through which the needle reciprocates.

The work-piece to be operated on is clamped between a work-plate 99, which is likewise provided with a needle opening and is slidingly mounted on the throat-plate 97. The work-plate 99 is secured upon the forward end of a bar 100 slidable in a guideway formed in a member 101 secured by screws 102 upon the upper surface of the work-supporting arm 1a. The rear end of the bar 100 is secured in a block 103 slidingly mounted on the upper surface of the arm 1a and having a portion 104 guided in a slot 105 in said arm, as shown in Fig. 4.

The article to be attached to the work-piece, shown in the drawings as a flat button, is held in a work-holder which comprises a pair of spring pressed jaws j, j, carried by arms k pivotally mounted at l to the underside of a clamp arm 106 secured, at its rear end, in a bracket 107, pivotally mounted, as by a pin 108, in the block 103. Secured upon and extending upwardly from the arm 106 is a bracket 109 having a forked upper end adapted to receive a stud 110 carried by a collar 111 clamped upon the lower end of a vertically disposed rod 112 sliding mounted in the bracket-arm head 5. The rod 112 and the button clamp attached thereto are normally urged downwardly by a coil spring 113 surrounding the rod and bearing at its upper end against a wall of the head 5 and at its lower end upon a collar 114 clamped upon the rod 112. The rod 112 and the button clamp may be raised in opposition to the spring 113 by actuation of a lever 115 fulcrumed intermediate its ends on a shoulder screw 116 threaded into a bracket 117 secured to the underside of the arm 4. The forward end of the lever 115 is forked and embraces a stud 118 carried by a depending arm 119 integral with the collar 114. The rear end of the lever 115 is adapted to be connected by a chain 120 to a suitable treadle, not shown, whereby actuation of the treadle raises and lowers the button clamp.

When attaching two-hole flat buttons d, as shown in Fig. 20, the button-clamp and the button therein are held against movement while the needle reciprocates and vibrates laterally to place a group f of attaching stitches through the two holes h and $h^1$ in the button; it being understood that the looper 66, needle-guide 91 and thread-positioner 93 vibrate laterally with the needle and that the needle makes the last two stitches in the same hole to effect a knotting or tying of the thread.

When attaching four-hole flat buttons e, as shown in Fig. 21, the button-clamp and the button therein are held stationary while the stitch-forming mechanism makes a group g of approximately one-half the entire number of attaching stitches, through the holes $h^2$ and $h^3$ in the button. The cam 32 is so formed that after this group of stitches has been made, the needle skips one lateral vibration and, with the needle elevated, the button-clamp and the button therein are moved lengthwise of the work-supporting arm 1a a distance sufficient to align the holes $h^4$ and $h^5$ with the path of vibration of the needle. On its next descent, the needle lays its thread over that portion between the two pairs of holes $h^2$, $h^3$ and $h^4$, $h^5$ as indicated at i. Thereafter the needle alternately reciprocates through the holes $h^4$ and $h^5$ until the group $g^1$ of stitches and the tying stitch have been completed.

Endwise movement of the button clamp on the arm 1a is effected from a cam groove 121 formed in the rear face of the cam wheel 13. The cam groove 121 (Fig. 1) comprises two concentric portions 121a and 121b, of different radii and each extending approximately 175 degrees, and two cross-over portions 121c and 121d connecting the concentric portions. Tracking the cam groove 121 is a roller stud 122 carried by the free end of an arm 123 secured upon one end of a horizontally disposed stub shaft 124 journaled in the standard 3. At its opposite end, the shaft 124 has secured to it an arm 125 having therein a segmental slot 126 in which is adjustably secured, by a wing nut 127, a stud 128 carried by one end of a link 129, the other end of which is pivotally connected, at 130, to the block 103. Thus, as the roller stud 122 passes from one concentric portion of the cam groove 121 to the other, the arm 125 is turned a predetermined extent about the axis of the shaft 124. The motion of this arm may be transmitted to the block 103 and the bar 100 and arm 106 by the link 129. The amount of movement transmitted by the link 129 is dependent upon the setting of the stud 128 in the slot 126. When the stud is in the upper end of the slot, and adjacent the pivotal point of the arm 125, zero motion is transmitted by the link 129 to the block 103 and the parts connected thereto. This adjustment is used when attaching two-hole buttons. When the stud 128 is adjusted to the outer end of the slot 126, maximum endwise movement is transmitted to the work-plate and the button-clamp.

It will readily be appreciated that in a large size four-hole button, the holes of each pair, and each pair of holes, are spaced apart a substantially greater distance than in a small size four-hole button. To change the machine to sew larger buttons after it has been set for smaller buttons, the operator will adjust the stud 38 downwardly in the segmental slot 36 of the lever arm 34b. This will increase the extent of lateral movement of the needle, looper etc. as hereinbefore explained. If the button to be attached is a four-hole button, the operator will also adjust the stud 128 downwardly in the slot 126 of the arm 125 to cause the cam groove 121 to shift the work plate and button clamp lengthwise of the arm 1a an amount equal to the spacing apart of the two pairs of holes in the button.

Cooperating with the take-up 26, 27 in controlling the thread and setting the stitch, is an oscillatory thread-controller arm 131 secured upon the forward end of a horizontally disposed rock-shaft 132 journaled in the bracket-arm head 5. The arm 131 is located mainly within the head 5 but has, at its free end, an offset portion 133 which projects through a slot 5c in the face-place 5a, and is provided with a thread-eye 134. Upon the rear end of the rock-shaft 132 there is clamped, by a screw 135, the split hub portion 136 of a lever 137, the forked free end of which embraces a triangular cam 138 carried by a collar 139 secured by a set screw 140 upon the drive shaft 6. Thus, rotation of the shaft 6 effects intermittent oscillation of the rock-shaft 132 and thereby intermittent oscillation of the thread-controller arm 131 and thread-eye 134 in timed relation with the movements of the take-up arm 26.

As shown in Fig. 1, thread t for the needle is taken from a suitable source of supply, not shown, and passes through a conventional intermittent tension 141 actuated periodically from a cam 142 on the main shaft 6, thence through a constant tension 143 and thread pull-off arm 144 operatively connected to the work-clamp lifting lever 115 to pull off thread from the supply each time the clamp is lifted, thereby to afford slack thread to facilitate the making of the first stitch of the next article attaching cycle. The thread then passes through a thread-nipper 145 adapted to be actuated by a rod 146, and bell-crank lever 147 from a cam block 148 secured upon the periphery of the cam wheel 13. This thread-nipper is timed and actuated to clamp the thread at the completion of the stitch forming cycle so that when the work-clamp is raised, to permit removal of the work, and the pull-off arm 144 is actuated to pull slack thread from the supply, thread may not be drawn back from the needle. Next the thread passes through a thread-guide 149 carried by the upper end of the face-plate 5ª, thence through the eye 134 in the thread-controller arm 131, eye 27 in the take-up arm 26, thread-guide 150 carried by the face-plate 5ª, and finally to the eye of the needle.

As hereinbefore explained, and as shown in full and dotted lines in Fig. 12, the relative positions of the needle, looper, needle-guide and thread-positioner are the same whether the needle is descending through one or the other of a pair of holes in a button.

The means for controlling the thread during the reciprocation of the needle and for setting the stitch will now be described, with special reference to Figs. 13 to 18 inclusive.

Assuming that the machine is in operation and that the parts have been brought to the position shown in full lines in Fig. 13 and in Figs. 14 and 15, i. e. with the needle-bar and needle at their uppermost positions, it will be observed that the take-up 26 is "up," the thread-controlling arms 131 is "down" and the looper is expanding the previously taken thread loop. During approximately the next 70 degrees of rotation of the main and looper shafts, the needle-bar, needle and take-up descend together, to the position indicated in dotted lines in Fig. 13, and the looper, needle-guide and thread-positioner are moved to the position shown in Figs. 16 and 17, while the thread controller arm stands still. This relative movement between the take-up eye 27 and the eye 134 in the thread-controller arm produces slack in the needle thread, as indicated by dotted lines in Fig. 13, to facilitate the making of the next stitch. During this movement, the thread-loop positioner 93 turns about the axis of the rock-shaft 83 and the forked end 93ᵇ thereof engages the thread loop and carries it to the left to the position shown in Fig. 16, to insure that the looper will carry the succeeding thread loop through the preceding thread loop. This action of the thread-positioner is the same whether the thread loop depends from the work beneath the hole at the left side of the button, as shown in Figs. 14, 16 and 18 or from beneath the hole at the right side thereof. In fact its function in deflecting the thread-loop is more pronounced and also more essential when the loop depends from beneath the right hand hole, as, in that position, without the thread-positioner it would be impossible for the looper to take a thread-loop from the needle in the hole at the left side and pass it through a loop depending beneath the hole on the right side.

The next rotation of the main and looper shafts of approximately 110 degrees causes the needle-bar, needle, take-up arm 26 and thread-eye 27 therein to descend from the position indicated in dotted lines in Fig. 13 to their "down" position indicated in dot-dash lines and causes the looper to be rotated from the position shown in Fig. 16 to approximately the position shown in Fig. 18. During this movement of the parts the thread-controller arm is turned counterclockwise (Fig. 13) thereby moving the portion 133 and thread-eye 134 therein from the "down" position shown in full lines in Fig. 13 to their "up" indicated in dot-dash lines. This relative movement between the thread-eyes 27 and 134 produces additional slack in the needle thread so that there is sufficient thread available for the formation of the next thread loop without undue tightness thereof.

During the next 180 degrees of rotation of the main and looper shafts, the looper takes the new thread-loop and passes it through the previously formed thread-loop, after which it sheds the latter and expands the new loop; the needle bar, needle and take-up 26, 27 are raised to their "up" position; the thread-controller arm 131 is turned clockwise to its "down" position; and the needle guide 91 and thread-positioner 93 are returned to their retracted positions, all as shown in Figs. 13 and 14. The upward movement of the take-up 26, 27 and the simultaneous downward movement of the thread-eye 134 takes up the slack in the thread and sets the stitch.

From Fig. 19 it will be apparent that during oscillation of the thread-positioner 93 a portion of its fork 93ᵇ will intersect the path of reciprocation of the needle. Were it not for the slack which is produced in the needle thread by the upward movement of the thread-controller arm 131, during the formation of each stitch, the thread extending from the looper to the work would be so tight that withdrawal of the forked end 93ᵇ of the thread-positioner and its consequent engagement with the thread and the deflection thereof would cause breaking of the thread. This is particularly true when thick buttons are attached to thick work, as for example when attaching large buttons to men's overcoats, as a considerable length of thread is utilized in the formation of each stitch, as will be apparent from Figs. 14, 16 and 18.

It will be understood that when equipped as shown in the drawings, and described in this specification, this machine is capable of attaching large, medium or small, two or four hole flat buttons.

It is also to be understood that by the substitution of other forms of article holding clamps for the button clamp shown and/or the substitution, for the cam wheel 13, of other cam wheels having cam grooves different from the cam grooves 32 and 121 shown, various other forms and sizes of articles may be attached. Also, that by the proper substitution of work-holders and cams, the machine may be adapted for various forms of tacking operations.

Having thus set forth the nature of the invention, what I claim herein is:

1. An article attaching machine having, in combination, a frame including a bed and a bracket-arm; a work-holder carried by said bed; a needle-bar mounted for reciprocatory and vibratory movements in said bracket-arm; means for reciprocating said needle-bar; a thread-carrying needle carried by said needle-bar; a loop-taker mounted in said bed and having a loop-seizing beak movable in a plane transversely of said work-holder for taking thread loops from the needle in the formation of stitches; and means comprising a rotary cam and operative connections between the cam and the needle-bar and loop-taker, operating during each of a plurality of successive reciprocations of the needle-bar in the formation of a group of stitches for bodily shifting said needle-bar, needle and loop-taker synchronously relative to said frame and work-holder in substantially said plane.

2. An article attaching machine having, in combination, a frame including a bed and a bracket-arm; a work-holder carried by said bed; a needle-bar mounted for reciprocatory and vibratory movements in said bracket-arm; means for reciprocating said needle-bar; a thread-carrying needle carried by said needle-bar; a rotary chain stitch looper mounted in said bed and having a loop-seizing beak rotatable in a plane transversely of said work-holder for taking thread loops from the needle in the formation of stitches; and means comprising a rotary cam and operative connections between the cam and the needle-bar and looper, operating during each of a plurality of successive reciprocations of the needle-bar in the formation of a group of stitches for bodily shifting said needle-bar, needle and looper synchronously relative to said frame and work-holder in substantially said plane.

3. An article attaching machine having, in combination, a frame including a bed and a bracket-arm; a work-holder carried by said bed; a needle-bar mounted for reciprocatory and vibratory movements in said bracket-arm; means for reciprocating said needle-bar; a thread-carrying needle carried by said needle-bar; a rotary chain stitch looper mounted in said bed and having a loop-seizing beak rotatable in a plane for taking thread loops from the needle in the formation of stitches; a movable thread-positioning finger for deflecting loops of thread held by said looper; and means operating during each of a plurality of successive reciprocations of the needle-bar for bodily shifting said needle-bar, needle, looper and thread-positioning finger relative to said frame and work-holder in substantially said plane.

4. An article attaching machine having, in combination, a frame including a bed and a bracket-arm; a work-holder carried by said bed; a needle-bar mounted for reciprocatory and vibratory movements in said bracket-arm; means for reciprocating said needle-bar; a thread-carrying needle carried by said needle-bar; a rotary chain stitch looper mounted in said bed and having a loop-seizing beak movable in a plane for taking thread loops from the needle in the formation of stitches; a combined needle-guide and thread-positioning member having portions movable between said work-holder and looper for guiding the needle and for deflecting loops of thread held by said looper; and means operating during each of a plurality of successive reciprocations of the needle-bar for bodily shifting said needle-bar, needle, looper, needle-guide and thread-positioning member relative to said frame and work-holder in paths substantially parallel to said plane.

5. An article attaching machine having, in combination, a frame including a bed and a bracket-arm; a work-holder carried by said bed; a needle-bar mounted for reciprocatory and vibratory movements in said bracket-arm; means for reciprocating said needle-bar; a thread-carrying needle carried by said needle-bar; a rotary shaft journaled in said bed; a rotary chain stitch looper mounted on said shaft and having a loop-seizing beak rotatable in a plane for taking thread loops from the needle in the formation of stitches; a cam on said shaft; a rock-shaft journaled beneath said rotary shaft; means actuated by said cam for oscillating said rock-shaft; a combined needle-guide and thread-positioning member mounted on said rock-shaft and having portions movable between said work-holder and said looper for guiding said needle and deflecting loops of thread held by said looper; and means operating during each of a plurality of successive reciprocations of the needle-bar for bodily shifting said needle-bar, needle, looper and member relative to said frame and work-holder in paths substantially parallel to said plane.

6. An article attaching machine having, in combination, a stationary frame including a bed and a bracket-arm; a work-holder carried by said bed; an oscillatory frame journaled on said bracket-arm; a needle-bar reciprocably mounted in said oscillatory frame; means for reciprocating said needle-bar; a thread-carrying needle carried by said needle-bar; a member mounted in said bed and having a loop-seizing beak movable in a plane for taking thread loops from the needle in the formation of stitches; a rotating cam; and means operated by said cam during each of a plurality of successive reciprocations of the needle-bar to swing said oscillatory frame and to shift said member thereby to bodily move said needle-bar, needle and beak relative to said frame and work-holder in substantially said plane.

7. An article attaching machine having, in combination, a stationary frame including a bed and a bracket-arm; a work-holder carried by said bed and extending lengthwise thereof; an oscillatory needle-bar frame journaled on said bracket-arm and having a tubular portion; a needle-bar reciprocably mounted in said tubular portion; means for reciprocating said needle-bar; a thread-carrying needle carried by said needle-bar; a shaft mounted in said bed for rotary and vibratory movements; a loop-taker secured upon said shaft and having a loop-seizing beak movable in a plane transversely of said work-holder for taking thread loops from the needle in the formation of stitches; means for rotating said shaft; and means operating during each of a plurality of successive reciprocations of the needle-bar for oscillating said needle-bar frame and for vibrating said shaft to effect bodily movement of said needle-bar, needle and loop-taker relative to said frame and work-holder in paths substantially parallel to said plane.

8. An article attaching machine having, in combination, a stationary frame including a bed and a bracket-arm; a work-holder carried by said bed; an oscillatory needle-bar frame journaled on said bracket-arm; a needle-bar reciprocably mounted in said needle-bar frame; means for reciprocating said needle-bar, a thread-carrying needle carried by said needle-bar; a loop-taker shaft mounted in said bed for rotary and vibratory movements; a loop-taker secured upon said shaft and having a loop-seizing beak movable in a plane for taking thread loops from the needle in the formation of stitches; a cam on said shaft; means for rotating said shaft; a rock-shaft journaled substantially parallel with said loop-taker shaft; means actuated by said cam for oscillating said rock-shaft; a needle-guide and a thread-positioning member mounted on said rock-shaft and each having a portion movable between said work-holder and said loop-taker for guiding said needle and for deflecting loops of thread held by said loop-taker, respectively; and means operating during each of a plurality of successive reciprocations of the needle-bar for oscillating said needle-bar frame and for vibrating said shaft to effect bodily movement of said needle, loop-taker, needle-guide and thread-positioning member, relative to said frame and work-holder in substantially said plane.

9. An article attaching machine having, in combination, a rotating element having a pair of cam portions; a work-holder; a reciprocatory and laterally movable thread-carrying needle; a member complemental to said needle and having a loop-seizing beak movable in a plane for taking thread loops from the needle in the formation of stitches; means actuated from one of said cam portions during each of a plurality of successive reciprocations of the needle for bodily shifting said needle and member relative to said work-holder in substantially said plane; and means actuated from the other of said cam portions for shifting said work-holder transversely of said plane.

10. An article attaching machine having, in combination, a rotating element having a pair of cam portions; a work-holder; a reciprocatory and laterally movable thread-carrying needle; a member complemental to said needle and having a loop-seizing beak movable in a plane for taking thread loops from the needle in the formation of stitches; a movable thread-positioning finger for deflecting loops of thread held by said member; means actuated from one of said cam portions during each of a plurality of successive reciprocations of the needle for bodily shifting said needle, member and thread-positioning finger in substantially said plane; and means actuated from the other of said cam portions for shifting said work-holder transversely of said plane.

11. An article attaching machine having, in combination, a rotating element having a pair of cam portions; a work-holder; a reciprocatory and laterally movable thread-carrying needle; a member complemental to said needle and having a loop-seizing beak movable in a plane for taking thread loops from the needle in the formation of stitches; an oscillatory element carrying a needle-guide and a thread-positioning finger for guiding the needle and for deflecting loops of thread held by said member; means for oscillating said element; means actuated from one of said cam portions during each of a plurality of successive reciprocations of the needle for bodily shifting said needle, member and element in substantially said plane; and means actuated from the other of said cam portions for shifting said work-holder transversely of said plane.

12. An article attaching machine comprising a main frame including a bed and a bracket-arm; a rotatable cam journaled on said bracket-arm; a work-holder; an oscillatory frame journaled on said bracket-arm; a needle-bar reciprocably mounted in said oscillatory frame; means to reciprocate said needle-bar; a thread-carrying needle carried by said needle-bar; a sub-frame slidingly mounted in said bed; a rotary looper shaft journaled in said sub-frame, a looper carried by said looper shaft and having a loop-seizing beak rotatable in a plane for taking thread-loops from the needle in the formation of stitches; a vertically disposed shaft journaled in said main frame; a bell-crank lever and a rock-arm fixed upon said vertically disposed shaft and connected respectively with said sub-frame and said oscillatory frame; and means for actuating said bell-crank lever from said cam to give to said needle-bar, needle and looper bodily shifting movements substantially in said plane during a plurality of successive reciprocations of said needle-bar.

13. An article attaching machine as set forth in claim 12 in which a single adjustable connection between the bell-crank lever and the cam serves to vary simultaneously and equally the extent of bodily shifting movement given to the needle and looper by the cam.

14. An article attaching machine as set forth in claim 12 in which there is also provided a second rotatable cam and operative connections from the cam to the workholder to shift the workholder relative to the plane of rotation of the looper beak after a predetermined number of reciprocations of the needle.

15. An article attaching machine as set forth in claim 12 in which there is also provided a second rotatable cam and operative connections therefrom to the work-holder to shift the workholder relative to the plane of rotation of the looper beak after a predetermined number of reciprocations of the needle and in which said operative connections include adjusting means for varying the amount of shift of the work-holder from zero to maximum.

16. An article attaching machine comprising a frame including a bed and a bracket-arm; a work-holder carried by said frame; a drive shaft journaled lengthwise of said bracket-arm; a stud fixedly secured in said frame transversely of said shaft; a member rotatably journaled on said stud and provided with a cam groove; means for rotating said member from said shaft; a vertically reciprocable and laterally movable needle-bar; means actuated by said drive shaft for reciprocating said needle-bar; a thread-carrying needle carried by said needle-bar; a member complemental to said needle and having a loop-seizing beak movable in a plane for taking thread loops from the needle in the formation of stitches; and means actuated from said cam groove during each of a plurality of successive reciprocations of the needle for bodily shifting said needle-bar, needle and member relative to said frame and work-holder in substantially said plane.

17. An article attaching machine comprising a frame including a bed and a bracket-arm; a work-holder carried by said frame; a drive shaft journaled lengthwise of said bracket-arm; a stud fixedly secured in said frame transversely of said shaft; a member rotatably journaled on said stud and provided with a pair of cam grooves; means for rotating said member from said shaft; a vertically reciprocable and laterally movable needle-bar; means actuated by said drive shaft for reciprocating said needle-bar; a thread-carrying needle carried by said needle-bar; a member complemental to said needle and having a loop-seizing beak movable in a plane for taking thread loops from the needle in the formation of stitches; means actuated from one of said cam grooves during each of a plurality of successive reciprocations of the needle for bodily shifting said needle-bar, needle and member relative to said work-holder in substantially said plane; and means actuated from the other of said cam-grooves for bodily shifting said work-holder after a predetermined number of reciprocations of the needle.

18. An article attaching machine comprising a frame including a bed and a bracket-arm; a work-holder carried by said frame; a drive shaft journaled lengthwise of said bracket-arm; a stud fixedly secured in said frame transversely of said shaft; a member rotatably journaled on said stud; means for rotating said member from said shaft; a cam wheel contacting said member and having a plurality of slots and a cam groove; a clamp screw passing through each of said slots and threaded into said member to secure said wheel to said member and to permit of relative angular adjustment therebetween; a vertically reciprocable needle-bar; means actuated by said drive shaft for reciprocating said needle-bar; a thread-carrying needle carried by said needle-bar; a member complemental to said needle for taking thread loops from the needle in the formation of stitches; and means actuated from said cam groove for effecting relative bodily movement between said needle and said work-holder transversely of the path of reciprocation of the needle.

19. An article attaching machine comprising a frame including a bed and a bracket-arm having a hollow head; a work-holder supported by said bed; a needle-bar mounted for reciprocatory and vibratory movements in said head; a fixed guide-bar mounted in said head substantially parallel with said needle-bar; a member slidingly mounted on said guide-bar; means for reciprocating said member; an operative connection between said member and said needle-bar whereby the needle-bar is reciprocated by said member and permitted to have lateral movements relative thereto; means for vibrating said needle-bar between alternate reciprocations of the needle-bar; a thread-carrying needle carried by said needle-bar; and a loop-taker cooperating with said needle in the formation of stitches.

20. An article attaching machine comprising a frame including a bed and a bracket-arm having a hollow head; a work-holder supported by said bed; a needle-bar mounted for reciprocatory and vibratory movements in said head; a fixed guide-bar mounted in said head substantially parallel with said needle-bar; a member slidingly mounted on said guide-bar; means for reciprocating said member; a slidable driving connection between said member and said needle-bar whereby the needle-bar is reciprocated by said member and permitted to have lateral movements relative thereto; means for vibrating said needle-bar between alternate reciprocations of the needle-bar; a thread-carrying needle carried by said needle-bar; a loop-taker cooperating with said needle in the formation of stitches; and means for shifting said work-holder relative to said head and needle-bar after a predetermined number of reciprocations of the latter.

21. An article attaching machine comprising a frame including a bed and a bracket-arm having a head; a work-holder supported by said bed; a needle-bar mounted for reciprocation in said head; a thread-carrying needle carried by said needle-bar; means for reciprocating said needle-bar; a loop-taker cooperating with said needle in the formation of stitches; a take-up device operated during each up-stroke of the needle-bar for tightening the stitch formed by the needle and loop-taker; and a thread-controller operative during each down stroke of the needle-bar for giving up thread to the needle and effective during each up-stroke of the needle-bar to cooperate with the take-up in tightening the stitch.

22. An article attaching machine comprising a frame including a bed and a bracket-arm having a head; a rotating shaft journaled in said bracket-arm; a work-holder supported by said bed; a needle-bar mounted for reciprocation in said head; a thread-carrying needle carried by said needle-bar; means actuated by said shaft for reciprocating said needle-bar; a loop-taker cooperating with said needle in the formation of stitches; a take-up device carried by said needle-bar and operated during each up-stroke thereof for tightening the stitch formed by the needle and loop-taker; and a thread-controller actuated by said shaft and operative during each down-stroke of the needle-bar for giving up thread to the needle and effective during each up-stroke of the needle-bar to cooperate with the take-up in tightening the stitch.

23. An article attaching machine comprising a frame including a bed and a bracket-arm having a head; a rotating shaft journaled in said bracket-arm; a cam on said shaft; a rock-shaft journaled in said head; means for actuating said rock-shaft from said cam; a work-holder supported by said bed; a needle-bar mounted for reciprocation in said head; a thread-carrying needle carried by said needle-bar; means actuated from said rotating shaft for reciprocating said needle-bar; a loop-taker cooperating with said needle in the formation of stitches; a take-up device carried by said needle-bar and operated during each up-stroke of the needle-bar for tightening the stitch formed by the needle and loop-taker; and an arm secured upon said rock-shaft and engaging the needle-thread, said arm acting during each down-stroke of the needle-bar to give up thread to the needle and during each up-stroke of the needle-bar to cooperate with the take-up in tightening the stitch.

24. An article attaching machine comprising a frame including a bed and a bracket-arm having a head; a work-holder supported by said bed; a needle-bar mounted for reciprocation in said head; a thread-carrying needle carried by said needle-bar; means for reciprocating said needle-bar; a loop-taker cooperating with said needle in the formation of stitches; a thread-positioning member for deflecting loops of thread held by said loop-taker, said thread-positioning member having a finger movable across the path of reciprocation of said needle and in its retractive movement into contact with the needle thread; a take-up device operated during each up-stroke of the needle-bar for tightening the stitch formed by the needle and loop-taker; and a thread-controller operative during each down-stroke of the needle-bar for giving up thread to the needle to put slack in the needle-thread to facilitate retraction of said finger and effective during each up-stroke of the needle-bar to cooperate with the take-up in tightening the stitch.

MICHAEL McCANN.

REFERENCES CITED

The following references are of record in the file of this patent:

UNITED STATES PATENTS

| Number | Name | Date |
| --- | --- | --- |
| 1,153,429 | Hleb | Sept. 14, 1915 |
| 1,780,309 | Myers | Nov. 4, 1930 |
| 2,158,199 | Reece | May 16, 1939 |
| 2,298,246 | McCann | Oct. 6, 1942 |